United States Patent [19]

Dumortier

[11] Patent Number: 4,573,423
[45] Date of Patent: Mar. 4, 1986

[54] DEVICE FOR ADJUSTING THE STEP OF THE MAST OF A SAILBOARD OR SIMILAR

[75] Inventor: Thierry M. Dumortier, Hermee, Belgium

[73] Assignee: Fabrique Nationale Herstal, en abrege FN, Societe Anonyme, Herstal, Belgium

[21] Appl. No.: 588,984

[22] Filed: Mar. 13, 1984

[30] Foreign Application Priority Data

Mar. 28, 1983 [BE] Belgium ............................ 2/60063

[51] Int. Cl.4 ............................................. B63B 15/00
[52] U.S. Cl. ........................................ 114/91; 114/39
[58] Field of Search ................ 114/39, 39.2, 90, 91, 114/102; 188/65.4

[56] References Cited

U.S. PATENT DOCUMENTS

| 639,364 | 12/1899 | Dooly | 188/65.4 |
| 1,856,804 | 5/1932 | Blackman | 114/91 |
| 4,273,062 | 1/1981 | Marker et al. | 114/91 |

Primary Examiner—Galen L. Barefoot
Assistant Examiner—Jesûs D. Sotelo
Attorney, Agent, or Firm—Schwartz, Jeffery, Schwaab, Mack, Blumenthal & Evans

[57] ABSTRACT

Device for adjusting the step of the mast of a sailboard or similar, characterized in that it comprises a slider receiving the foot of the mast, the slider being associated with a slide which may be secured to the hull of the board, a friction locking means acting on the slider for securing it relative to the slide and a control member provided for varying the friction of the locking member on the slider, thereby allowing shifting of the latter to the slide.

2 Claims, 4 Drawing Figures

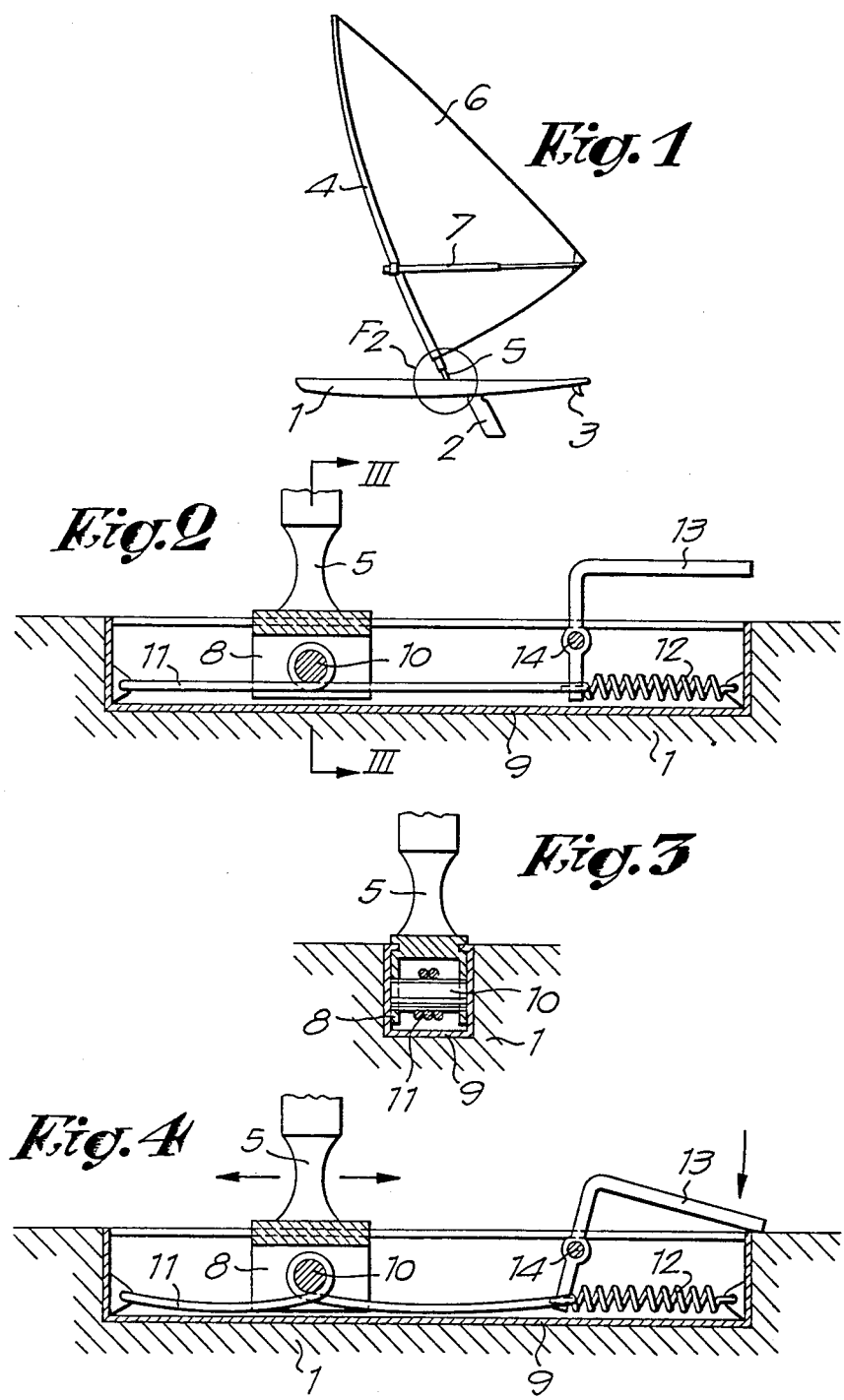

DEVICE FOR ADJUSTING THE STEP OF THE MAST OF A SAILBOARD OR SIMILAR

The present invention relates to a device for adjusting the step of the mast of a sailboard or similar.

It is known that the position of the step of the mast on a hull has a substantial influence upon the behaviour of the boat as a function of various parameters such as the weight of the user, the characteristics of the sail, the wind force, the state of the navigated water etc.

For this reason, it has already been suggested to provide the hull with at least two distinct housings for the step of the mast. Of course, this solution does not allow any fine adjustment. In addition, it is substantially unusable when navigating, e.g. in boat races.

Progresses have been developped with devices allowing to vary longitudinally the position of the mast step. These known devices are relatively complex, expensive and often not easily operated when navigating.

The purpose of the present invention is to solve the above described problem in a particularly efficient and economical manner.

For this purpose, the invention relates to a device comprising a slider receiving the foot of the mast, said slider being associated with a slide which may be secured to the hull of the board; a friction locking means acting on the said slider for securing it relative to the said slide and a control member provided for varying the friction of the said locking means on the slider, thereby allowing the shifting of the latter relative to the said slide.

For more clearness, a non limiting embodiment of the invention will be described hereafter by way of example, reference being made to the enclosed diagrammatic drawings in which:

FIG. 1 is a side view of a sailboard;

FIG. 2 is a view on an enlarged scale showing the portion indicated in F2 in FIG. 1;

FIG. 3 is a section taken on the line III—III of FIG. 2; and

FIG. 4 is a view similar to that of FIG. 2, showing another characteristic position of the device according to the invention.

The board shown in FIG. 1 is of a quite conventional type, the said figure being given only for situating the invention.

The board comprises substantially a hull or a float 1 provided with a center-plate 2 and fins 3.

A mast 4 may be removably secured to the hull through a mast foot consisting, e.g. of an elastomer twin wheel assembly or a Cardan joint. Said mast 4 supports a sail 6 tightened through a wishbone 7. All these arrangements are well known.

The device according to the invention (FIGS. 2 to 4) comprises a slider 8 housed in a slide 9.

Said slider is being removably secured to the mast foot 5 (by screwing, through a bayonet system or similar, said means being not shown for the clearness of the drawing).

The slide 9 is made integral with the hull 1 and it is preferably embedded therein.

The slider 8 is substantially U-shaped in cross-section. An axle 10 extends between the two wings of the slider to which it is rigidly secured at its ends.

A locking member 11 extends in the slide 9, one end of said member being secured to the front end (the end closest to the stem of the hull 1) of the slide 9 and its other end is secured to a traction spring 12 which is itself secured to the rear end of the slide. Between its both ends, the said member 11 forms two dead turns about the axle 10.

A control member or pedal 13 under the form of a bent lever is pivoted in 14 on the said slide.

One of the legs of the said lever penetrates the said slide 9 where it engages the end of the spring 12 to which is secured the member 11.

In the position shown in FIG. 2, the traction of the spring 12 on the member 11 is such that the friction between the latter and the axle 10 locks the slider 8, thereby preventing any shifting of the latter in the slide 9.

When tilting the lever 13, e.g. by pressing down the foot, the spring 12 is extended, thereby giving slack to the member 11 and, accordingly reducing the friction between the latter and the axle 10. The slider may be then shifted in the desired direction and on the desired distance. As soon as the user no longer pushes lever 13, the device comes back to the state shown in FIG. 2, the stable position.

Thus, it is apparent that the above described device is very simple, inexpensive and operated in a particularly easy and rapid manner. The adjustment of the position of the step of the mast may be extremely fine.

It is apparent that the invention is not at all limited to the above described example, numerous modified embodiments being possible without departing from the scope of the following claims.

I claim:

1. Device for adjusting the step of a mast of a sailboard comprising: a slider receiving the foot of the mast, said slider being associated with a slide adapted to be secured to the hull of the board; a friction locking means acting on the said slider for securing it relative to said slide and a control member provided for varying the friction of said locking means on the slider, thereby allowing the shifting of the latter relative to said slide; said locking means comprising a member secured through one of its ends to one end of said slide and forming at least one dead turn on an axle provided therefor on said slider and secured, at its other end, through a traction spring, to the other end of said slide.

2. Device according to claim 1, characterized in that the said control member consists of a bent lever pivoted on the said slide and one leg of which extends outside the latter, the other leg extending in the slide and engaging the end of the said spring to which the said member is secured.

* * * * *